UNITED STATES PATENT OFFICE.

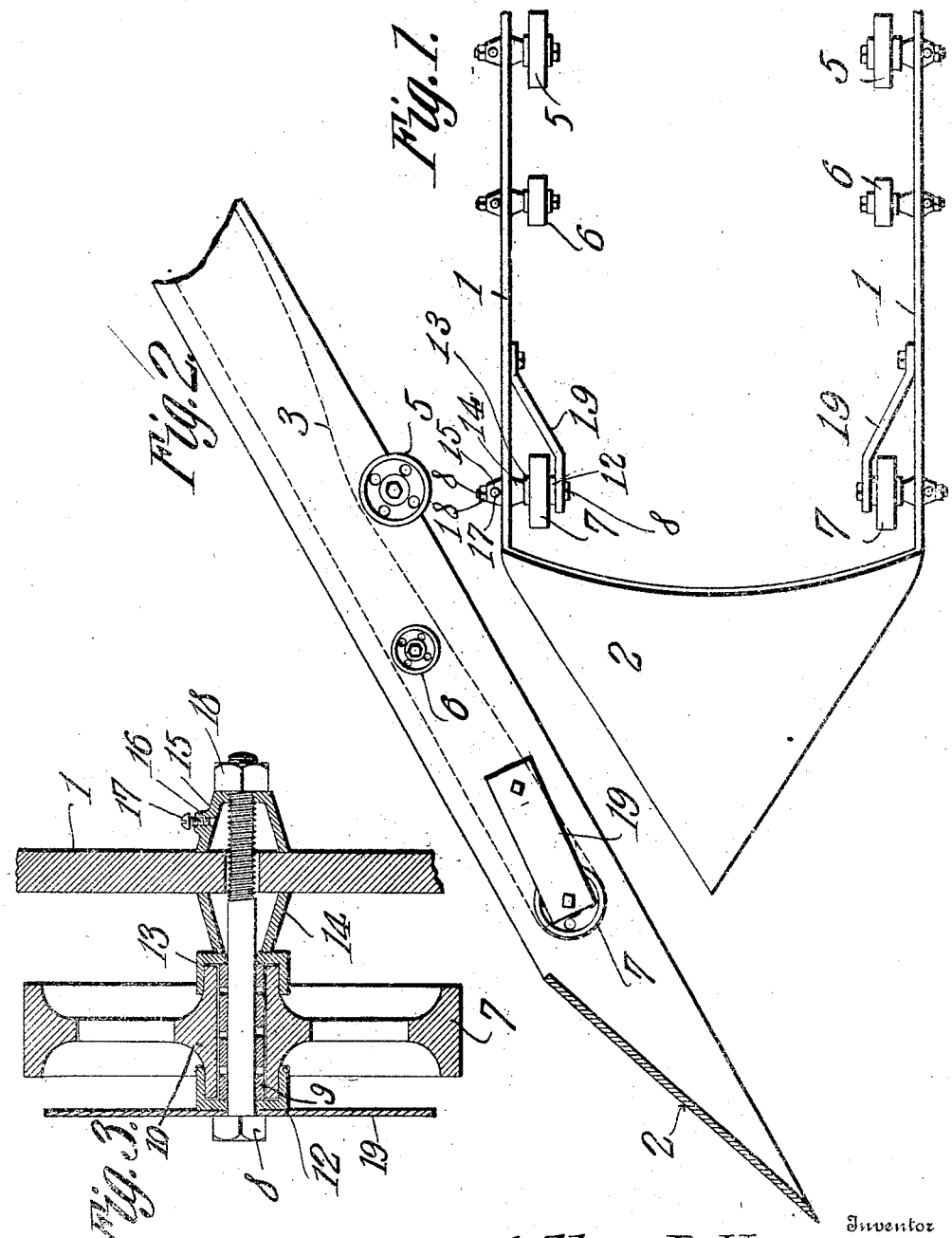

ARTHUR LEWIS HOOVER, OF AVERY, OHIO.

POTATO-DIGGER.

No. 903,978.

Specification of Letters Patent.

Patented Nov. 17, 1908.

Application filed May 28, 1908. Serial No. 435,575.

*To all whom it may concern:*

Be it known that I, ARTHUR LEWIS HOOVER, a citizen of the United States, residing at Avery, in the county of Erie and State of Ohio, have invented a new and useful Potato-Digger, of which the following is a specification.

This invention has relation to potato diggers and it consists in the novel construction and arrangement of its parts hereinafter shown and described.

The object of the invention is to provide a potato digger with an elevator frame and a continuous conveyer mounted for movement therein which is so supported and guided in its path of movement as to avoid tendency for collecting stone or other foreign bodies. Guiding wheels of special construction are provided for supporting the conveyer and means are provided upon the frame for preventing stone from chocking in behind the guiding wheels and interfering with the proper operation of the same.

With these and other objects in view the invention consists in the novel construction pointed out hereinafter.

In the accompanying drawings, Figure 1 is a plan view of the lower end portion of the elevator frame with parts removed. Fig. 2 is a longitudinal sectional view of the lower end portion of the elevator frame, and Fig. 3 is a transverse sectional view cut through one of the guiding wheels of the endless conveyer.

The frame of the conveyer consists of the side pieces 1—1, which are connected together at their lower ends by the plow or cutter 2. An endless elevator indicated by the dotted line 3 in Fig. 2 is adapted to travel longitudinally along the frame of the implement. The guiding wheels 5, 6 and 7 are mounted upon the inner side of the sides 1 of the frame of the implement and the conveyer 3 passes over the guiding wheels 5, and under the guiding wheels 6, and around the guiding wheels 7. The wheels 5 are designed to pitch the lower portion of the conveyer 3 at a proper angle with relation to the ground in order that the said lower portion of the said conveyer may release stones or other objects which might be accidentally picked up. The said wheels 5 prevent the lower run of the conveyer from bowing downwardly and forming a pocket for the stones. The guiding wheels 6 are designed to hold the upper portion of the conveyer 3 in a straight or substantially straight line. The guiding wheels 7 are designed to determine the lower end portion of the path of movement of the conveyer 3.

The spindles 8 pass transversely through the sides 1 of the implement, and the perforated sleeves 9 are loosely mounted upon the said spindles. The hubs 10 of the wheels 7 are journaled upon the sleeves 9. The said sleeves 9 are longer than the hubs 10. The cups 12 and 13 are also mounted upon the spindles 8 and receive the end portions of the hub 10. The oil chamber 14 is interposed between the side of the cup 13 and the side 1 of the frame of the implement. The said cup 14 is also mounted upon the spindle 8. The oil cup 15 is mounted upon the spindle 8 and is located against the other side 1 of the frame of the implement. Said oil cup 15 is provided with a port 16 which is normally closed by a screw 17. By removing the screw 17 oil may be introduced into the interior of the compartment 15. A nut 18 is screw threaded upon the end of the spindle 8 and is adapted to hold the parts in position as indicated in Fig. 3 of the drawings. The description above given of the arrangement of the wheels 7 upon the spindles 8 is done for the purpose of clearly defining how each of the wheels 5, 6 and 7 is mounted upon its respective spindle. The guard strips 19 are provided adjacent the wheels 7. Said strips 19 are attached at their upper ends to the inner sides 1 of the frame of the implement, and converge toward each other, and pass about the rear edge portions of the peripheries of the wheels 7, and are connected at their front end portions with the inner end portions of the spindles 8 upon which the wheels 7 are mounted. The guard strips 19 are disposed out of parallel alinement with the lower portions of the path described by the movement of the conveyer 3. And the said guard strips 19 are designed to prevent stones which fall through the upper portion of the conveyer 3, and lodge upon the lower portion thereof from becoming stuck in between the wheels 7 and the sides 1 of the frame of the implement. The said guard strips 19 are so disposed that when the stone comes in contact with the same it is forced toward the middle of the space between the side 1 of the frame of the implement, and eventually the said stone will fall through the lower portion of the conveyer without interfering with the proper movement of the same or its supporting wheels. Thus it will be seen that the space in the interior of the conveyer 3 is unobstructed and stones or other foreign bodies which may pass through the upper portion of the conveyer may also pass through the lower portion thereof without becoming lodged or stuck in behind the supporting wheels. Frequently stones of irregular shape will pass through the upper run of the conveyer 3, and until such stones are presented properly to the lower run of the conveyer 3, they cannot pass through the same. Consequently, the lower portion of the lower run of the conveyer 3 is pitched at a slight angle to the upper run of the conveyer, in order to roll such stones towards the lower portion of the conveyer, and during this act of rolling, better opportunity is afforded to present the stones to the spaces in the lower run of the conveyer, whereby the said stones may pass through the same. The upper ends of the guard-strips 19 are in close proximity to the lower run of the conveyer 3, and, consequently, when a stone or stones come in contact with the upper ends of the said guard-strips, the stones are shunted or forced toward the middle of the conveyer 3 and away from the wheels 7.

By removing the screw 17 the chambers 14 and 15 may be filled with oil or a lubricant and as the wheels 11 rotate they create a certain amount of suction in the interiors of the hubs 10 which draws the lubricant in from the chamber 14 into the sleeve 9, and thus the said wheels are lubricated upon their journal bearings.

Having described my invention what I claim as new and desire to secure by Letters Patent is:

1. In a potato digger an elevator frame, a conveyer mounted for movement thereon, conveyer guiding wheels journaled in the sides of the frame, and guard strips attached to the sides of the frame and converging toward each other about the rear portions of the said guiding wheels.

2. In a potato digger an elevator frame, a conveyer mounted for movement thereon, conveyer guiding wheels journaled at the sides of the frame, spindles supporting said wheels, and guard strips attached to the sides of the frame and converging toward each other and being connected at their forward end portions with the inner end portions of the said spindles.

3. In a potato digger an elevator frame, a conveyer mounted for movement thereon, conveyer guiding wheels journaled at the sides of the frame, spindles supporting said wheels, and guard strips attached to the sides of the frame and converging toward each other and being connected at their forward end portions with the inner end portions of said spindles said strips being disposed out of parallel relation with the path of movement of the conveyer.

4. In a potato digger an elevator frame, a conveyer mounted for movement thereon, conveyer guiding wheels journaled in the sides of the frame, spindles located at the opposite sides of the frame and having their inner ends spaced apart, and guard strips attached to the sides of the frame and converging toward each other and being connected at their forward end portions with the inner end portions of the said spindles.

In testimony that I claim the foregoing as my own, I have hereto affixed my signature in the presence of two witnesses.

ARTHUR LEWIS HOOVER.

Witnesses:
   WM. WOLVERTON,
   FRED A. ROBERTS.